United States Patent

Schupp

[11] Patent Number: 5,181,022
[45] Date of Patent: Jan. 19, 1993

[54] APPARATUS FOR USE IN REFUELING MARINE TANKS

[76] Inventor: Alfred Schupp, 110 Navesink Ave., Highlands, N.J. 07732

[21] Appl. No.: 640,973

[22] Filed: Jan. 14, 1991

[51] Int. Cl.$^5$ .............................................. G08B 21/00
[52] U.S. Cl. ................................... 340/616; 340/612; 340/984; 141/95; 137/558
[58] Field of Search ............. 340/612, 616, 450.2, 340/984; 73/49.2 T; 116/227; 141/95, 198; 220/374, DIG. 27; 137/557, 587, 589, 551, 558

[56] References Cited

U.S. PATENT DOCUMENTS 3,857,850 12/1974 Rohan ............................. 137/558 X
4,854,469 8/1989 Hargest ................................ 220/374
5,023,608 6/1991 Delisle, Jr. et al. ............ 340/406 X Primary Examiner—Jin F. Ng
Assistant Examiner—Jeffery A. Hofsass
Attorney, Agent, or Firm—Arthur L. Lessler

[57] ABSTRACT

An arrangement for determining when a fuel tank installed in a boat is full, including (i) a proximity detector for detecting when fuel starts to flow up the vent stack, and (ii) a small reservoir in the vent stack above the proximity detector to prevent fuel from escaping from the stack before the filling of the tank can be halted in response to a warning signal generated in response to the output of the proximity detector.

10 Claims, 3 Drawing Sheets

APPARATUS FOR USE IN REFUELING MARINE TANKS

BACKGROUND OF THE INVENTION

This invention relates to apparatus for use in filling a fuel tank of a boat with liquid fuel, and more particularly to an arrangement for providing a warning signal after the tank is full and before fuel erupts from the tank vent, so that the filling of the tank can be halted prior to the escape of any fuel.

Fuel tanks for boats usually have a generally vertical filling pipe and a generally vertical vent stack, the top of the vent stack being at a lower elevation than the top of the filling pipe, and usually exiting through the hull of the boat. The vent stack has a relatively small inside diameter, typically on the order of ½ inch to 9/16 inch.

As a result of the small diameter of the vent pipe, when the fuel tank (which fills relatively slowly) has filled to capacity, fuel rises very rapidly in the vent stack and continues to do so until the flow of fuel into the filling pipe is halted.

At present, when a fuel tank of a boat is being filled, the person doing so watches the vent stack and stops filling the tank when fuel starts to spurt out of the top of the stack. This results in the fuel which comes out of the stack spilling onto the boat or into the water, presenting a safety and/or environmental hazard.

In U.S. Pat. No. 4,802,514 to Morse, excess fuel which spills out of the vent stack is caught by a receptacle temporarily secured to the hull by suction cups. The receptacle must be installed before, and removed and emptied after each refueling operation, a time consuming and tedious process.

U.S. Pat. No. 4,854,469 to Hargest provides a baffled housing coupled to the top of the vent stack to serve as a small reservoir which contains fuel coming out of the stack for a short time which is long enough to allow the filling of the tank to be halted. The housing has a transparent wall through which one can watch for the spurting of fuel from the top of the vent stack and thus stop filling the tank before the reservoir fills and the excess fuel comes out of the top of the vent stack.

The arrangement of Hargest, however, suffers from several drawbacks. Since the first indication of the tank having been filled is the visual observation of the spurting of fuel from the top of the vent stack, the housing must necessarily be positioned at the top of the stack, which precludes early detection of the full condition of the fuel tank. Further, constant cleaning of the inner and outer surfaces of the transparent wall is necessary to prevent the view of the top of the vent stack from being obscured. The housing of Hargest must be positioned where it can be readily seen, an esthetically undesirable situation and one which does not allow for positioning of the housing where it will make the most efficient use of available space. In addition, the arrangement of Hargest is incapable of providing a remote audible and/or visual warning signal.

While various float and sight glass mechanisms are known in the art for monitoring the level of fuel in a tank, these are not sufficiently accurate and/or too slow to respond, for the purpose of determining when the fuel tank of a boat is full, in sufficient time so that the filling of the tank can be halted before fuel spills from the vent stack into the environment. See, for example, U.S. Pat. Nos. 1,316,167 to Lecrone; 2,947,330 to Savage; 3,684,127 to Kruse; 4,083,387 to Stieber et al.; and 4,815,436 to Sasaki et al.

Accordingly, an object of the present invention is to provide an improved apparatus for use in filling a fuel tank of a boat with liquid fuel, which is capable of providing a warning signal when the tank is filled to capacity and before fuel spills out of the vent stack into the environment.

Another object of the invention is to provide an improved apparatus for facilitating the filling of a fuel tank of a boat without spillage of fuel out of the top of the vent stack, which apparatus can be simply and easily retrofitted to existing tank installations.

SUMMARY OF THE INVENTION

As herein described, there is provided apparatus for use in filling a fuel tank of a boat with liquid fuel, the tank having a filling pipe and a vent pipe extending therefrom. The apparatus includes a reservoir housing adapted to be positioned above the tank. The housing has a vent entry port adapted to communicate with the vent pipe and a vent exit port adapted to communicate with the atmosphere, for delaying the delivery to the exit port of fuel entering the housing via the entry port, by accumulating a quantity of fuel within the housing. A detector means detects the presence of liquid fuel in a portion of the vent pipe disposed above the fuel tank and below the reservoir housing, and provides an output signal indicative of the presence of liquid fuel in that portion of the vent pipe. An alarm means responsive to the output signal from the proximity detector provides a warning signal when liquid fuel moves from the tank into the vent pipe portion, and before any such fuel flows out from the exit port of the reservoir housing and spills out into the boat or the environment.

IN THE DRAWING

DETAILED DESCRIPTION

Figure 1:
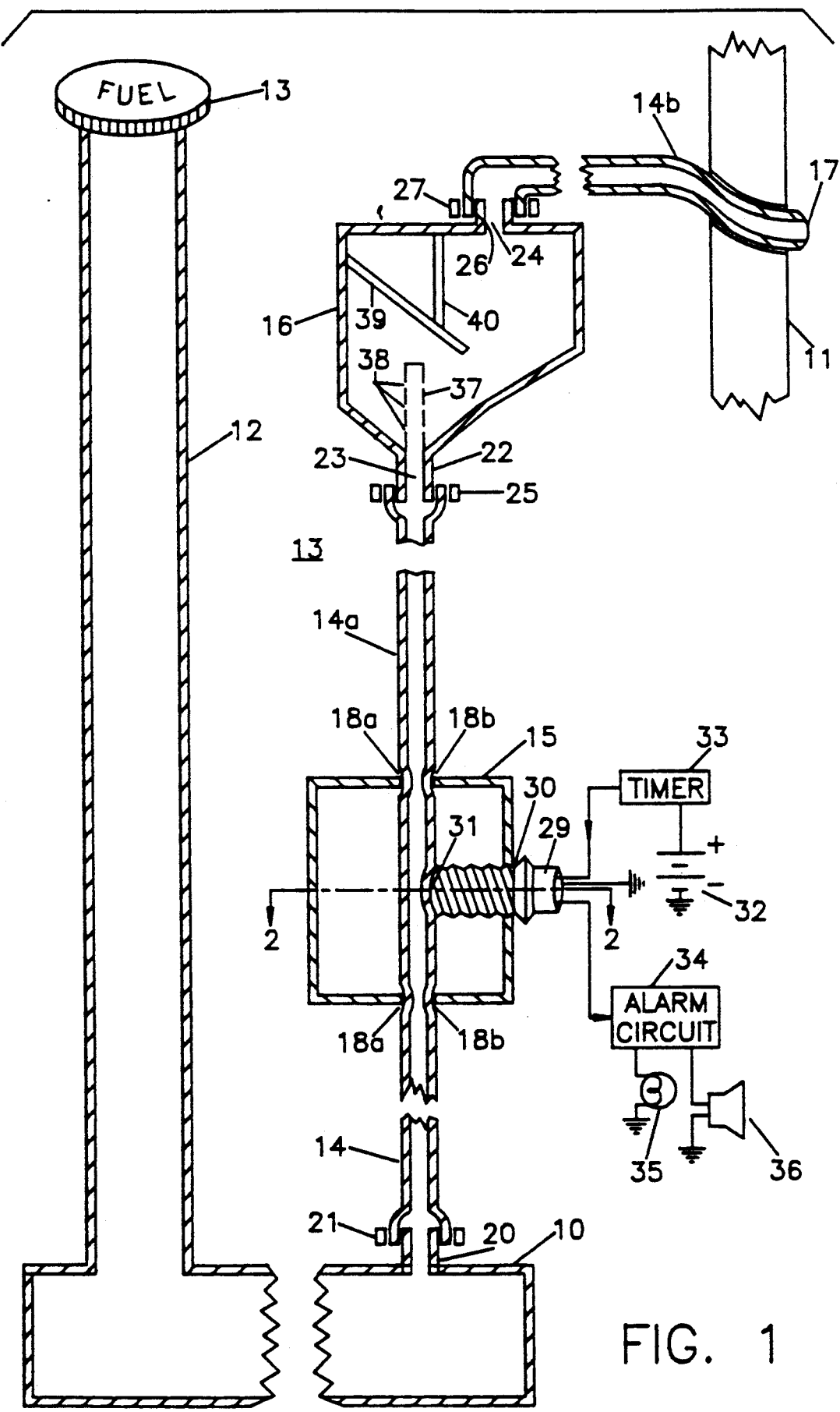
FIG. 1 is a cross-sectional partially isometric elevation view showing a preferred embodiment of the apparatus of the present invention installed on the vent stack of a fuel tank of a boat.

As shown in FIG. 1, a boat (not shown) has a fuel tank 10 for receiving a liquid fuel such as diesel fuel or gasoline, and a hull 11. The tank 10 is filled via a generally vertical fuel pipe 12 having a cover 13 which is removed when the tank is to be filled. A generally vertical vent stack 13 communicates the interior of the tank 10 to the atmosphere through a passage in the hull 11 above the water line of the boat, so that water does not enter the vent stack. The top of the fuel pipe 12 is at a higher elevation than the top of the vent stack.

The vent stack 13 includes a resilient vent pipe 14 having a lower portion 14a extending from the tank 10, through a detector housing 15, and to the lower or vent entry port 23 of a reservoir housing 16; and an upper portion 14b extending from the upper or vent exit port 24 of the reservoir housing 16 through the hull 11 to a vent screen assembly 17 which permits air to escape from the vent stack to the environment while preventing dirt and other contaminants from entering the vent stack. The assembly 17 may, for example, be of the type described in U.S. Pat. No. 4,877,152 to Whitley.

The vent pipe 14 is made of a resilient dielectric material, preferably nonconductive plastic such as marine fuel vent hose or a nylon-reinforced neoprene material.

Figure 3:
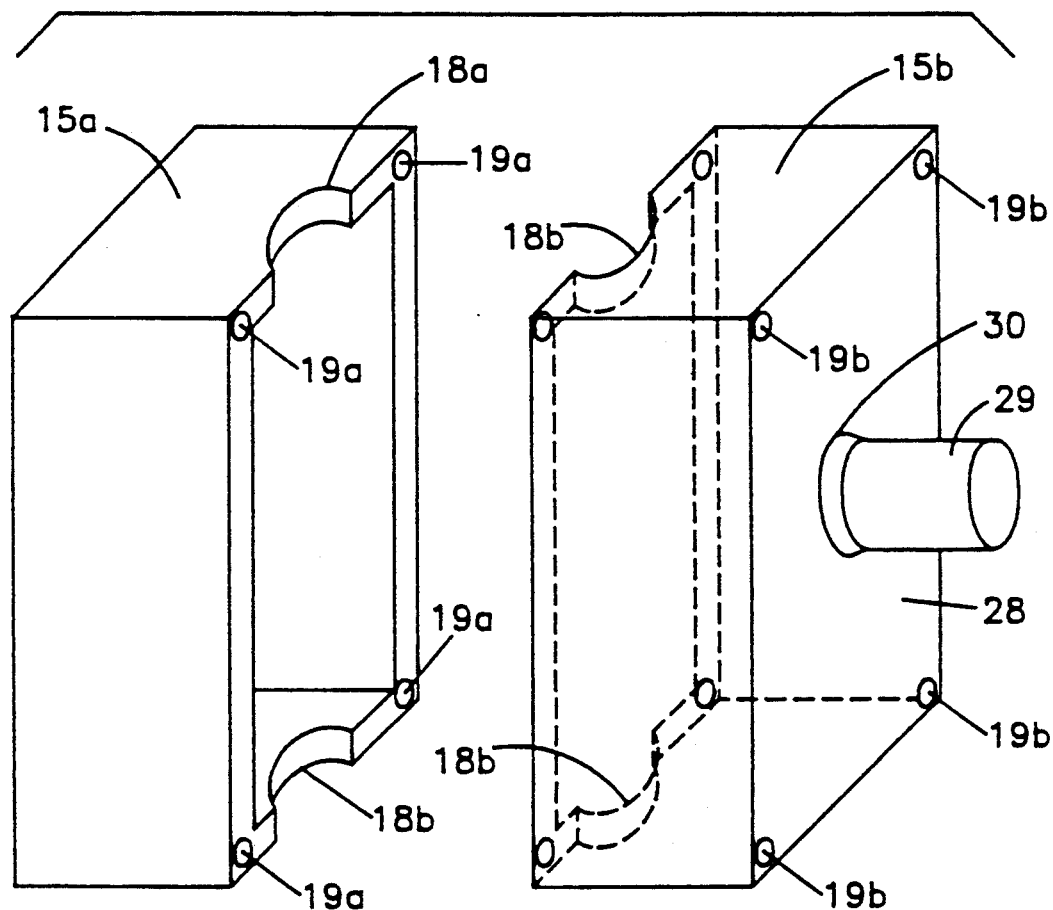
FIG. 3 is an isometric view of the major parts of the detector housing which constitutes part of the apparatus shown in FIG. 1.

The detector housing 15, as best shown in FIG. 3, has a box-like shape and comprises two nonconductive plastic dielectric box parts 15a and 15b. The box part 15a has upper and lower generally semicircular cutouts 18a, while the box part 15b has similar cutouts 18b. Each of the cutouts 18a is adapted to mate with a corresponding one of the cutouts 18b to form a generally circular shape having a diameter slightly less than the outer diameter of the adjacent part of the vent pipe 14, so that the box parts can be assembled around the vent pipe 14 and secured to each other by screws extending through the holes 19b in box part 15b into corresponding threaded holes 19a in box part 15a. When the box parts 15a and 15b are so assembled, the cutouts 18a/18b cooperate to clamp the detector box 15 to the vent pipe 14, as seen in FIG. 1.

The bottom end of the lower portion 14a of the vent pipe 14 is clamped to a fitting 20 extending from the fuel tank 10, by means of a clamp 21. The top end of said lower portion 14a is clamped to a fitting 22 extending from the vent entry port 23, by means of a clamp 25. The inboard end of the upper portion 14b of the vent pipe 14 is clamped to a fitting 26 extending from the vent exit port 24, by means of a clamp 27.

Figure 2:
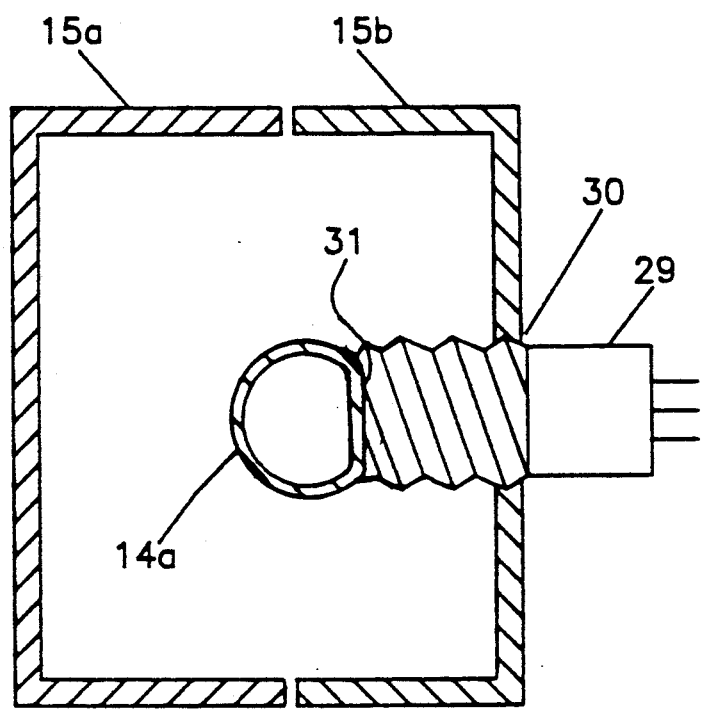
FIG. 2 is a cross-section plan view showing the detector housing and adjacent portion of the vent pipe, taken along the cutting plane 2—2 of FIG. 1.

The side wall 28 of detector housing box part 15b has a threaded hole 30 therein which supports and threadably engages the outer cylindrical threaded surface of the body of a proximity detector 29. The detector 29 is threadably inserted into the interior of the detector housing 15 a sufficient distance so that the sensing head 31 thereof is caused to press against the outer surface of the adjacent part of the vent pipe lower portion 14a so as to flatten said outer surface (giving the affected part of the vent pipe portion 14a a generally D-shaped cross-section, as best seen in FIG. 2) to provide an increased area of contact with the sensing head 31, so that the sensitivity of detection of the presence of fuel within said adjacent vent pipe part is increased. The outer diameter of the sensing head 31 is preferably on the order of the outer diameter of the lower portion 14a of the vent pipe 14a.

The proximity detector 29 preferably is a capacitive type proximity switch such as one of the Model KI-3015 series manufactured by Efector, Inc., 805 Springdale Drive, Exton, Pa. 19341. This unit has an adjustable sensitivity which is set so that the switch operates when and only when liquid fuel is present in the portion of the vent pipe adjacent the detector sensing head 31. The proximity detector preferably responds to the presence of fuel in a small fraction of a second, typically on the order of 0.1 second or less.

DC power is supplied to the detector 29 from the boat battery 32 via a timer 33 which allows power to continue to be supplied while the boat ignition switch is on and for about 45 minutes after the ignition switch is turned off, to allow adequate time for refueling of the tank 10.

The proximity switch 29 is connected in series between the battery 32 and an alarm circuit 34 which provides visual and audible alarms via a flashing light 35 and speaker 36 whenever liquid fuel is present in the part of the lower portion 14a of the vent pipe 14 adjacent the sensing head 31 of the proximity detector 29.

The lower part of the interior of the reservoir housing 16 has an inverted generally conical or pyramidal shaped portion for guiding fuel therein toward the inlet pipe 37, which communicates with the top end of the lower portion 14a of the vent pipe 14. The cylindrical walls of the part of the inlet pipe 37 disposed within the reservoir housing have holes 38 through which fuel within the reservoir housing may re-enter the inlet pipe and flow back to the tank 10 through the lower portion 14a of the vent pipe 14.

The top of the inlet pipe 37 is disposed within the interior of the reservoir housing 16 and is open, so that fuel entering said interior via the inlet pipe shoots up and is deflected by the baffle 39, which prevents such fuel from going directly into the exit port 24. The baffle 39 is held in position by the support rod 40.

As the tank 10 is filled by entry of liquid fuel via the filling pipe 12, the fuel level in the tank rises slowly. However, as soon as the tank reaches capacity, fuel begins to enter the bottom of the vent stack and the level of fuel in the vent pipe 14 rises very rapidly. In a typical fuel tank and vent arrangement according to the prior art, the fuel rises from the top of the tank to the top of the vent stack in about one second and spills out the top of the vent pipe, the spillage of fuel alerting the person filling the tank to stop doing so.

In the arrangement of the present invention, however, the detector housing 15 and proximity detector 29 are preferably located near the bottom of the vent stack, and must be located below the reservoir housing 16. After the tank has reached capacity, as soon as fuel starts to rise in the vent stack the presence of fuel is detected by the proximity detector 29 and visual and audible alarms are immediately given at a location near the top of the filling pipe 12, to alert the person filling the tank to stop doing so.

As the fuel continues to rise in the vent stack, it enters the interior of the reservoir housing 16 via the open top of the inlet pipe 37 and begins to fill the reservoir, so that there is a time delay of at least a few seconds (depending on the size of the reservoir within the housing) before the reservoir fills and fuel begins to leave the reservoir via the exit port 24.

The combination of (i) the early detection of the presence of fuel in the vent stack and the associated remote early warning to the person filling the tank, with (ii) the delay (introduced by the reservoir within the reservoir housing 16) in the time it takes the fuel to rise to the top of the vent stack, enables the person filling the tank to easily stop the filling of the tank before any fuel spills out from the vent screen 17 onto the side of the hull or into the water. As a result, the safety and environmental hazards which would otherwise be caused by such spillage of fuel are eliminated.

Since the detector housing can be installed without cutting the vent pipe 14, and the reservoir housing is installed at an easily accessible position on the vent stack, the arrangement of the present invention is easily retrofitted to existing marine fuel tank installations.

We claim:

1. Apparatus for use in filling a fuel tank of a boat with liquid fuel, said tank having a filling pipe and a vent pipe extending therefrom, comprising:

a reservoir housing adapted to be positioned above said tank, said housing having a vent entry port adapted to communicate with said vent pipe and a vent exit port adapted to communicate with the atmosphere, means within said housing operatively associated with said vent pipe and having one or more openings disposed within the reservoir housing for enabling fuel to escape from said vent pipe into said housing, and for enabling at least some of the fuel which collects within the housing to flow back into said vent pipe and down to said tank, said reservoir housing serving to delay the delivery to said exit port of fuel entering said housing via said entry port, by accumulating a quantity of fuel within the housing;

detector means adapted to be mounted adjacent an outer surface part of said vent pipe for detecting the presence of liquid fuel in a portion of said vent pipe disposed above said fuel tank and below said reservoir housing, said detector means providing an output signal indicative of the presence of liquid fuel in said vent pipe portion; and alarm means responsive to said output signal for providing a warning signal when liquid fuel moves from said tank into said vent pipe portion, and before any such fuel flows out from the exit port of said reservoir housing and spills out into the boat or the environment.

2. The apparatus according to claim 1, wherein said detector means comprises a proximity detector having a sensing head, and a detector housing adapted to hold said sensing head against said outer surface part of said vent pipe.

3. The apparatus according to claim 2, wherein said vent pipe portion is made of a resilient material, and said detector housing is adapted to cause said detector means sensing head to press against said outer surface part of said vent pipe so as to flatten said outer surface part to provide an increased area of contact with said sensing head, so that the sensitivity of detection of the presence of said fuel is increased.

4. The apparatus according to claim 2, wherein said vent pipe portion is made of a resilient dielectric material.

5. The apparatus according to claim 3, wherein said vent pipe portion is made of a resilient dielectric material.

6. The apparatus according to claim 2, 3, 4 or 5, further including means for clamping said detector housing to said vent pipe.

7. In a boat having a fuel tank installed therein, apparatus for use in filling the tank with liquid fuel, said tank having a filling pipe and a vent pipe extending therefrom, comprising:

a reservoir housing positioned above said tank, said housing having a vent entry port communicating with said vent pipe and a vent exit port communicating with the atmosphere, means within said housing operatively associated with said vent pipe and having one or more openings disposed within the reservoir housing for enabling fuel to escape from said vent pipe into said housing, and for enabling fuel which collects within the housing to flow back into said vent pipe and down to said tank, said reservoir housing serving to delay the delivery to said exit port of fuel entering said housing via said entry port, by accumulating a quantity of fuel within the housing;

a proximity detector having a sensing head mounted adjacent an outer surface part of said vent pipe for detecting the presence of liquid fuel in a portion of said vent pipe disposed above said fuel tank and below said reservoir housing, said detector providing an output signal indicative of the presence of liquid fuel in said vent pipe portion; and alarm means responsive to said output signal for providing a warning signal when liquid fuel moves from said tank into said vent pipe portion, and before any such fuel flows out from the exit port of said reservoir housing and spills out into the boat or the environment.

8. The apparatus according to claim 7, wherein said vent pipe portion comprises a resilient material, further comprising a detector housing for holding said sensing head against said outer surface part of said vent pipe.

9. The apparatus according to claim 8, wherein said detector housing is adapted to cause said detector means sensing head to press against said outer surface part of said vent pipe so as to flatten said outer surface part to provide an increased area of contact with said sensing head, so that the sensitivity of detection of the presence of said fuel is increased.

10. Apparatus for use in filling a fuel tank of a boat with liquid fuel, said tank having a filling pipe and a vent pipe extending therefrom, comprising:

a reservoir housing adapted to be positioned above said tank, said housing having a vent entry port adapted to communicate with said vent pipe and a vent exit port adapted to communicate with the atmosphere, for delaying the delivery to said exit port of fuel entering said housing via said entry port, by accumulating a quantity of fuel within the housing;

detector means for detecting the presence of liquid fuel in a portion of said vent pipe disposed above said fuel tank and below said reservoir housing, said detector means providing an output signal indicative of the presence of liquid fuel in said vent pipe portion; and alarm means responsive to said output signal for providing a warning signal when liquid fuel moves from said tank into said vent pipe portion, and before any such fuel flows out from the exit port of said reservoir housing and spills out into the boat or the environment.

* * * * *